United States Patent [19]
Olmsted et al.

[11] Patent Number: 5,443,263
[45] Date of Patent: Aug. 22, 1995

[54] SPACIAL COMPONENT CONFIGURATION SYSTEM

[76] Inventors: Robert G. Olmsted, Laurel Living Center, 91 Chestnut St., Manchester, Conn. 06040; Alvah A. Russell, 237 Mountain Rd., Glastonbury, Conn. 06033

[21] Appl. No.: 183,518
[22] Filed: Jan. 19, 1994
[51] Int. Cl.6 .............. A63F 9/12; G09B 1/40
[52] U.S. Cl. ................. 273/157 R; 273/160; 434/172
[58] Field of Search ............. 273/157 R, 157 A, 160; 434/159, 160, 171, 172

[56] References Cited
U.S. PATENT DOCUMENTS

| 257,630 | 5/1882 | Whitney | 273/157 R X |
| 3,638,949 | 2/1972 | Thompson | 273/157 R |
| 4,153,254 | 5/1979 | Marc | 273/160 |
| 4,428,732 | 1/1984 | Meyer | 434/160 |
| 4,534,563 | 8/1985 | Guenther | 273/157 R |
| 4,699,602 | 10/1987 | Giorgi | 446/124 |

FOREIGN PATENT DOCUMENTS

| 2512350 | 7/1981 | France . | |
| 3500840 | 12/1985 | Germany . | |
| 521465 | 3/1955 | Italy | 434/167 |
| 484259 | 8/1936 | United Kingdom . | |

Primary Examiner—William H. Grieb
Attorney, Agent, or Firm—Baker & Daniels

[57] ABSTRACT

A puzzle including a number of individual component pieces that each have a two dimensional shape and a third dimension of depth. The two dimensional shape of each component piece forms at least a portion of a two dimensional outline of an alphanumeric character. The component pieces can be arranged and oriented by a user such that the alphanumeric characters outlined thereby communicate a comprehensible message. The component pieces can also be assembled in an interlocking fashion into various three dimensional structures specified to a user as puzzle solutions.

17 Claims, 9 Drawing Sheets

SPACIAL COMPONENT CONFIGURATION SYSTEM

BACKGROUND OF THE INVENTION

This invention relates to puzzles, and, in particular, to puzzles wherein a particular shape is formed by assembling together separate smaller component pieces.

Physical puzzles or contrivances which allow a user to assemble a quantity of separate pieces into a recognizable object offer numerous benefits to society. These puzzles typically provide a source of enjoyable activity which is both intellectually stimulating as well as inexpensive. In addition to the recreational aspects of puzzles, properly designed physical puzzles may also function as a valuable developmental tool for children. For instance, while children are playfully operating a physical puzzle, they are developing and refining their mental and physical skills which will be valuable in the future.

Previous puzzles or puzzle type toys include those disclosed in U.S. Pat. Nos. 4,699,602, 4,534,563, and 4,153,254, which employ various smaller sized geometric figures that can be assembled into larger geometric structures, for example a cube or other polyhedron. U.S. Pat. No. 3,638,949 similarly allows formation of a cube from smaller sized geometric figures, but couples this exercise with a mathematical task of ensuring that a numerical total on the cube faces, resulting from numerals along the figure faces, is the same for all cube faces. While a useful developmental exercise from the standpoint of improving a child's coordination, these puzzles do not further a child's understanding of, for example, the letters of the alphabet and the relationship these letters have with words and sentences.

Other puzzles, such as those disclosed in U.S. Pat. No. 4,428,732 and German Patent Document 35 00 840 A1, involve the exercise of forming alphabet letters or numbers from variously shaped component pieces. Another type puzzle, disclosed in French Patent Document 2,512,350, involves forming, substantially in two dimensions, a puzzle by fitting geometric shapes together with either component pieces shaped like the letters of the alphabet or arabic numerals. While these puzzles may familiarize a child with the individual letters which compose the alphabet, no word or sentence structures are taught. Furthermore, little three-dimensional conceptualization is required to be used by users of these puzzles.

SUMMARY OF THE INVENTION

In one form thereof, the puzzle of the present invention includes a plurality of individual component pieces that each have a two dimensional shape and a third dimension of depth. The two dimensional shapes of at least two of the component pieces are different, and the two dimensional shape of each component piece forms at least a portion of a two dimensional outline of an alphanumeric character. The component pieces can be arranged and oriented by a user such that the alphanumeric characters outlined thereby communicate a comprehensible message. The component pieces can also be assembled into a three dimensional structure.

In another form thereof, the puzzle of the present invention includes a plurality of component pieces which each are formed from one or more interconnected cubes arranged such that each component piece has a two dimensional shape and a uniform depth. The two dimensional shape of each component piece forms at least a portion of a two dimensional outline of an alphanumeric character. The component pieces can be arranged and oriented by a user such that the alphanumeric characters outlined thereby communicate a comprehensible message. In addition, the component pieces can be assembled in an interlocking fashion into various three dimensional structures specified to a user as puzzle solutions.

An advantage of the present invention is that it provides users of all ages with an intellectually stimulating puzzle. Another advantage of the present invention is that it may foster the mental development of a child who plays with the puzzle by teaching that child to conceptualize in three dimensions as well as familiarizing that child with the letters of the alphabet and the way words and sentences may be formed from these letters. Another advantage of the present invention is that it may foster the physical development of a child who plays with the puzzle by improving that child's hand-eye coordination. Other advantages of the present invention will become apparent from the following description.

DESCRIPTION OF THE PREFERRED EMBODIMENTS

Figure 1:
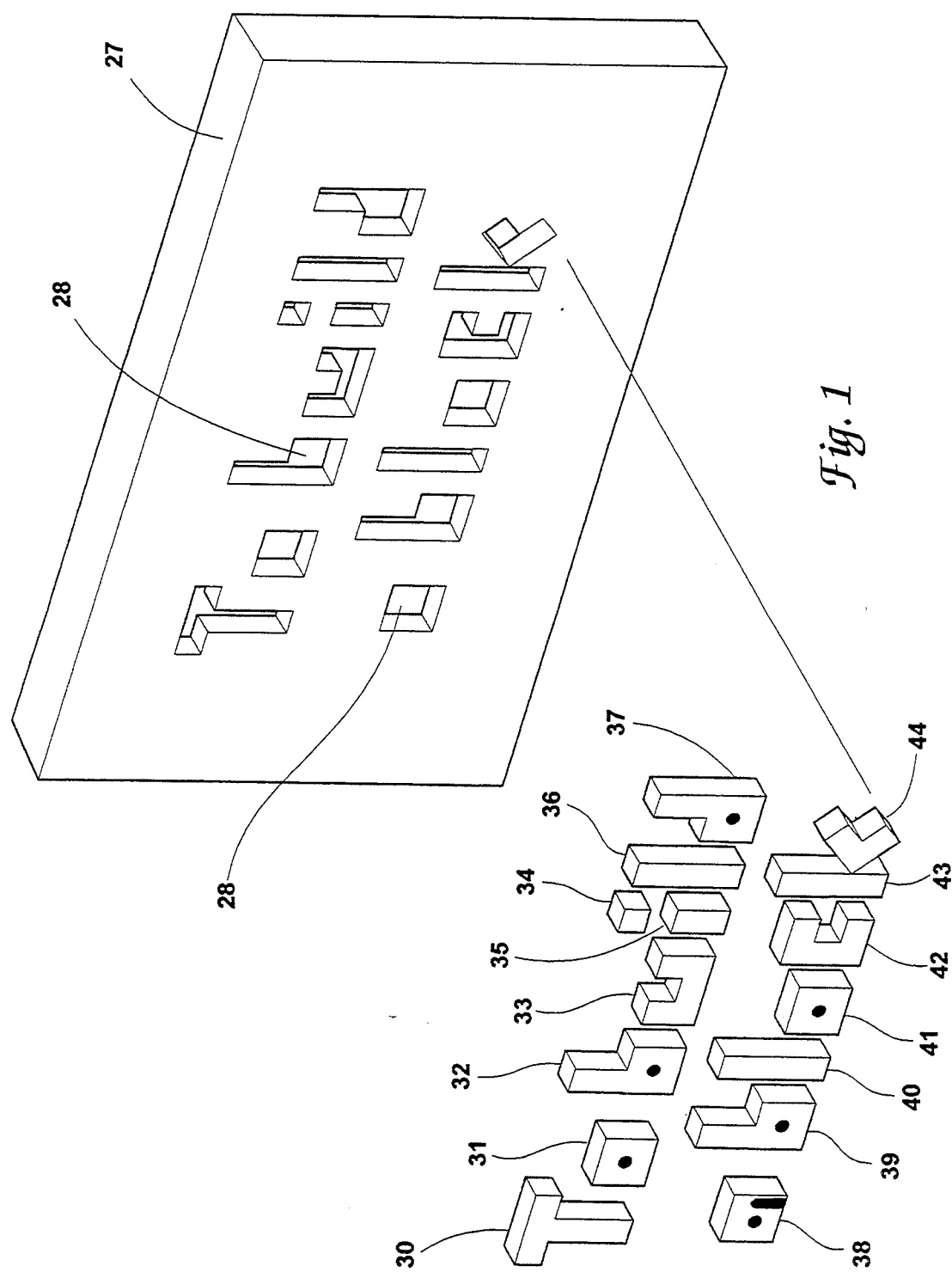
FIG. 1 is a perspective view of one embodiment of the present invention, wherein the component pieces are shown removed from their template and in a proper arrangement and orientation to convey a message.
Figure 4:
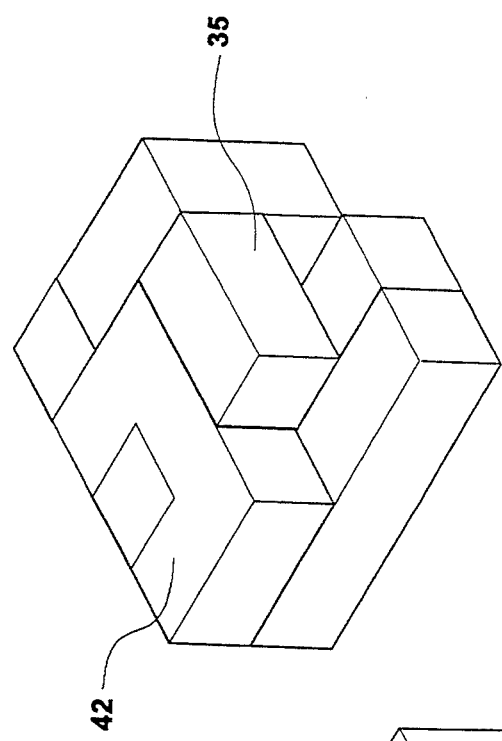
FIGS. 2-8 show step-by-step instructions for assembling the component pieces of the invention embodiment illustrated in FIG. 1 into a three-dimensional cube structure.
Figure 3:
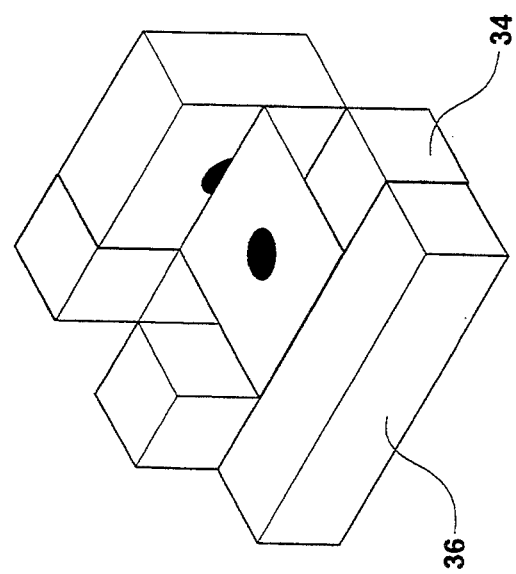

Referring now to FIG. 1, there is illustrated a first embodiment of the puzzle of the present invention wherein the puzzle components pieces are shown removed from template 27. Fifteen individual or separable component pieces 30-44 are preferably employed and can be made of a number of shape retaining materials, including various plastics and woods. When arranged in the proper sequence shown and when properly oriented, for example rotating the "d" such that it does not read "p", component pieces 30-44 spell out the clause "To build a block". Depending on the age and intelligence level of the puzzle user, arranging the component pieces in the proper message communicating manner may be part of the puzzle challenge. For example, starting with all the pieces jumbled together, a user may order the pieces to determine the puzzle message, which in this embodiment instructs the user of a puzzle solution, namely a block. Alternatively, if for some reason a user is unable to independently order the component pieces into a comprehensible message, template 27 described below can be used to assist a puzzle user in this task.

Component pieces 30-33, 35-44 are each in essence formed from interconnected cubes of identical size ranging in quantity from two cubes, i.e. "i" component piece 35, to six cubes, e.g. "T" component piece 30. Component piece 34, which forms the dot of "i" component piece 35, is formed from a single cube of identical size to the cubes interconnected to form the other component pieces.

The cubes forming component pieces 30-44 are arranged such that component pieces 30-44 each have a two dimensional shape, with dimensions in reference to the vertical height and horizontal width of the pieces as shown in FIG. 1, and a third dimension of depth or thickness. The interconnected cubes or cube forming each component piece 30-44 lie in a common plane, and consequently each component piece 30-44 has a uniform depth. As shown, the uniform depth of each component piece 30-44 is preferably also the same for all the component pieces of the puzzle.

Still referring to FIG. 1, it will be appreciated that the two dimensional shape of component pieces 30-33, 36-42 individually define the two dimensional outline of alphabet letters "T", "o", "b", "u", "l","d", "a", "b", "l", "o", and "c"respectively. The two dimensional outlines of alphabet letters "i" and "k" are defined by the combination of component pieces 34-35 and 43-44 respectively when properly positioned. Other alphanumeric characters, including marks of punctuation, could also be defined by one or more component pieces of other embodiments within the scope of the present invention. The two dimensional alphanumeric character outlines represented by component pieces 30-44 preferably are block-like, i.e. have squared off corners, as shown. This block-like construction promotes a more precise fit between components during their assembly into a three dimensional structure as described further below. In the preferred embodiment, holes associated with the alphabet letters "a", "b","d" and "o", and the crevice for the letter "a", are distinct markings on the planar top surfaces of the component pieces. By including such markings on only one side, the puzzle user will better know what alphanumeric character the component piece represents, for example not confusing a "b" as another "d". Alternatively, the holes and crevices of various letters can be actual bores passing through the component pieces. With this alternative construction, the bores will preferably be smaller than the smallest extension of a component piece or smallest component piece, for example the "i" dot component piece 34, such that users of the shown puzzle embodiment will not mistake the bore for an aperture to receive a component piece.

As shown in FIG. 1, template 27 includes recesses 28 appropriately sized to receive components 30-44. Template 27 prompts the puzzle user to orient and arrange the individual puzzle component pieces properly in order to spell out or communicate an appropriate and sensible message. In addition, template 27 can be incorporated into a puzzle storage device, for example by including a mating cover which holds the component pieces therebetween.

Figure 2:
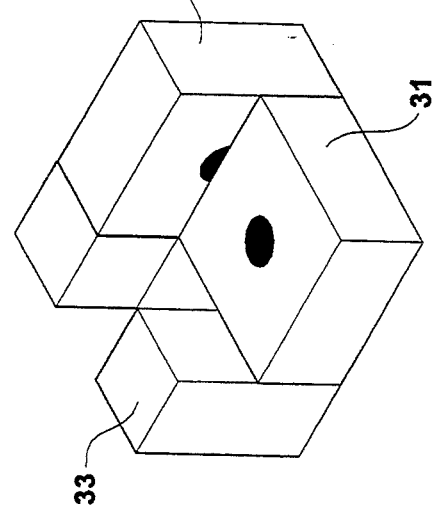
Figure 7:
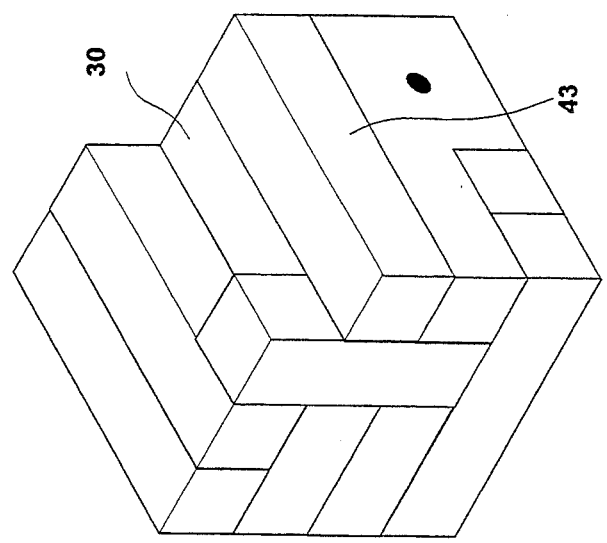
Figure 6:
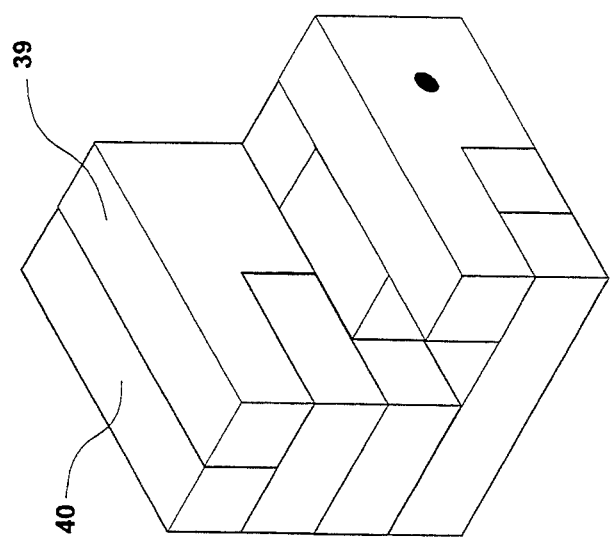
Figure 5:
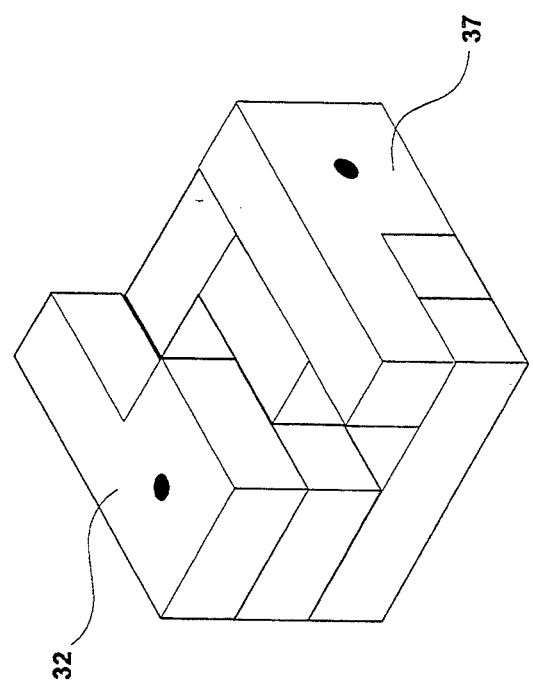

Referring now to FIGS. 2-7, a possible step-by-step solution to the assembly of the puzzle embodiment of FIG. 1 into a three-dimensional cube structure is illustrated. With the two "o" component pieces 31, 41 and the "u" component piece 33 oriented as shown in FIG. 2 as a starting point, additional component pieces can be assembled into the puzzle as shown in FIGS. 3-8. The order in which these component pieces are shown added is not mandatory, but is merely illustrative. It will be appreciated that a puzzle user attempting to form a cube structure will likely not succeed by randomly stacking component pieces atop one another. Instead, due to the interlocking fashion in which the structure is assembled whereby gaps or notches within certain component pieces receive other component pieces, a puzzle user must plan ahead and conceptualize in three dimensions in order to assemble the puzzle properly.

Figure 9:
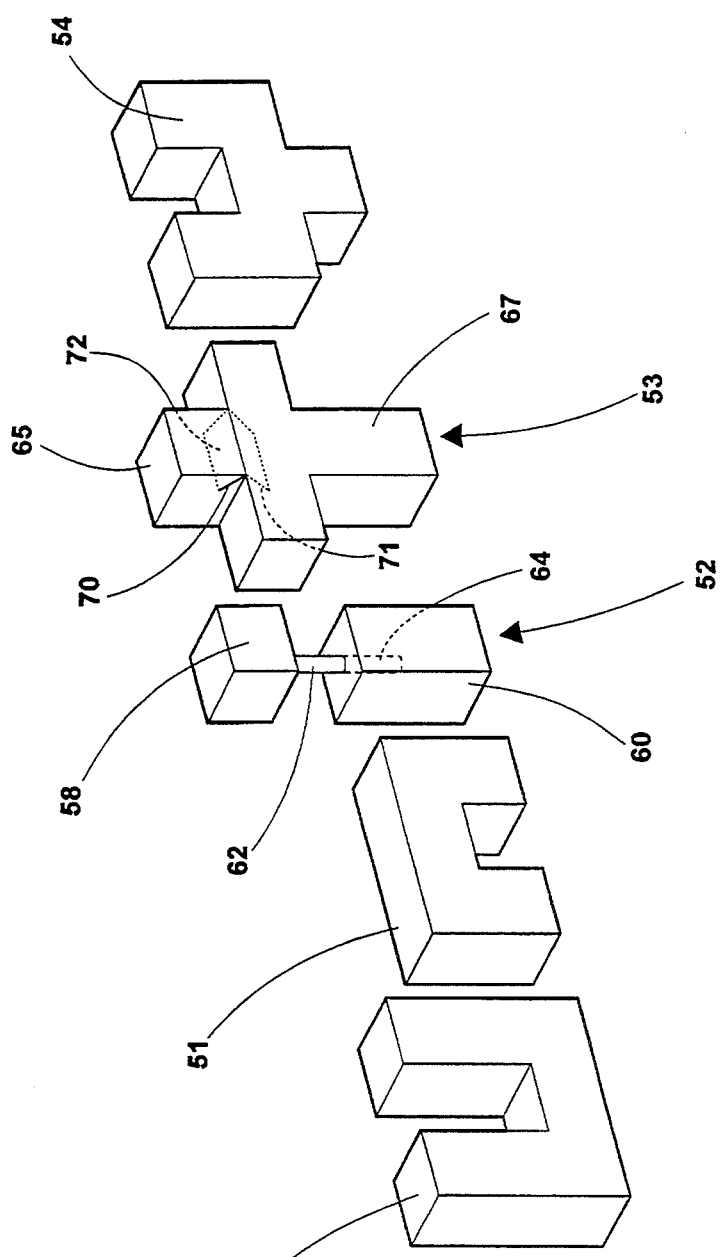
FIG. 9 shows a perspective view of another embodiment of the present invention where the component pieces are in a proper arrangement and orientation to communicate a message.
Figure 8:
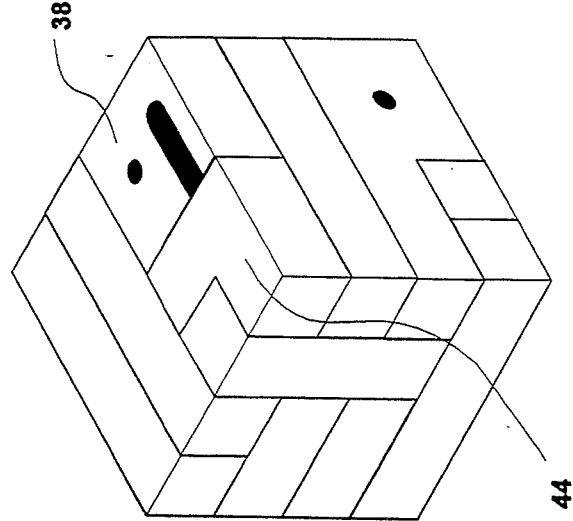

FIG. 9 shows a perspective view of another embodiment of the present invention. Five component pieces 50-54 can be arranged and oriented as shown to communicate the message "Unity", as well as be manipulated and assembled as described below to form a cube structure. In this embodiment, "U" component piece 50, "n" component piece 51, and "Y" component piece 54 are each a block-like alphabet letter constructed as a rigid, single piece and in shapes essentially formed of interconnecting multiple cubes of a uniform size.

The "i" component piece, generally designated 52, of the "Unity" embodiment is constructed of a dot cube 58, a coupling cylindrical dowel 62, and an "i" base 60. Dowel 62, which is fixedly attached to dot cube 58, is sized to be slidingly received within a centered cylindrical bore 64 within "i" base 60. The spatial relationship which dot cube 58 has with "T" base 60 is maintained by a frictional engagement of dowel 62 by the surfaces of bore 64. When dot cube 58 is pushed downward from the position shown in FIG. 9, dowel 62 slides deeper into bore 64, and in this manner dot cube 58 can be positioned in contact with "i" base 60 such that "i" component piece 52, for purposes of assembly of a structure, is equivalent to three aligned interconnected cubes of the same uniform size as used to form the other four components.

Figure 10:
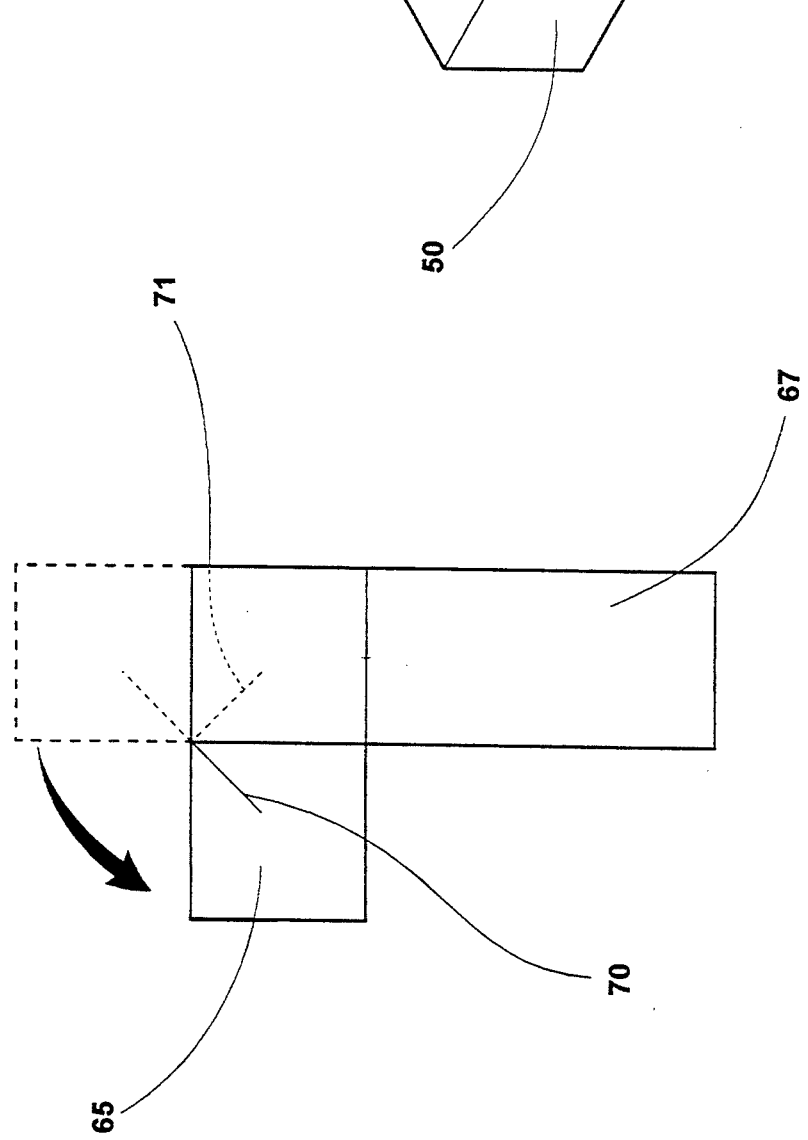
FIG. 10 is a right side elevational view of the "t" component piece of the invention embodiment illustrated in FIG. 9 showing the multiple orientations into which the component piece can be manipulated.
Figure 14:
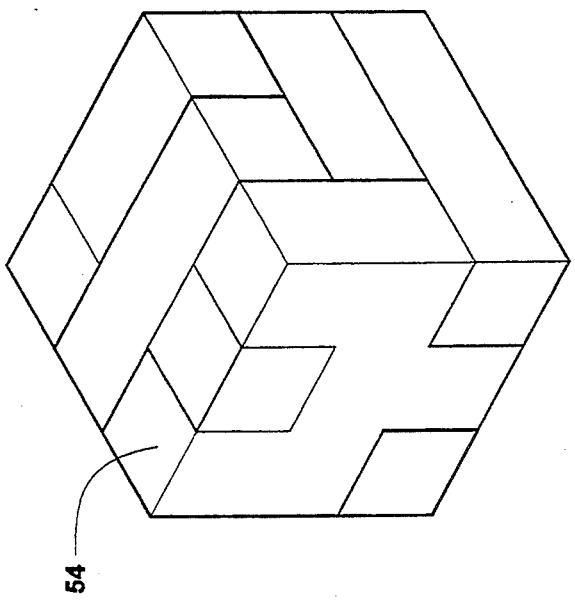
Figure 13:
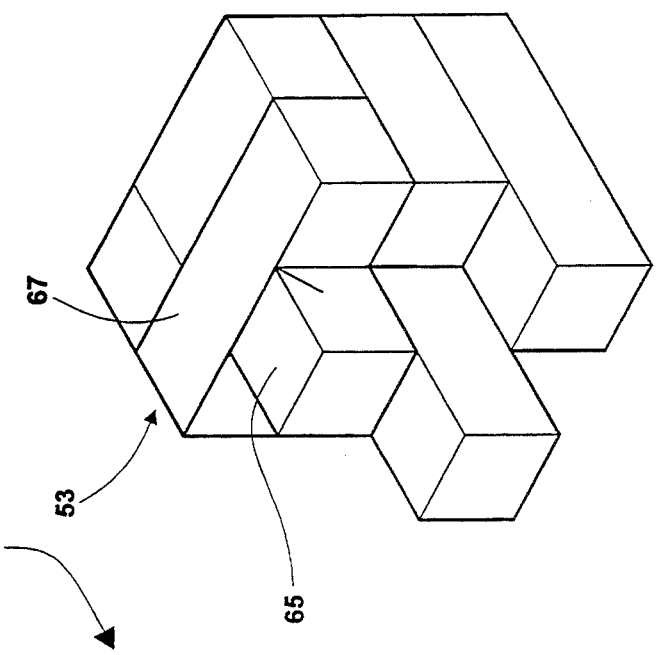

Referring now to FIGS. 9 and 10, the preferred construction of the "t" component piece, generally designated 53, is more particularly described. In order for the preferred size "t" to be incorporated into a puzzle solution three dimensional cube structure, the upper cube 65 of "t" component piece 53 must be movable from its message communicating position, shown in FIG. 9 as well as in shadow lines in FIG. 10, to the structure forming position adjacent the upper portion of the "t" base 67 of "t" component piece 53 shown in solid lines in FIG. 10. This movement is preferably accomplished with a hinge mechanism allowing upper cube 65 to pivot, along the direction represented by the arrow in FIG. 10, about the upper forward edge of "t" base 67. The preferred hinge mechanism employs a flexible, rectangular shaped piece of material 72, such as cloth. During construction of "t" component piece 53, material 72 is inserted into angled notches 70, 71 cut into edges of upper cube 65 and "t" base 67 respectively. Glue or other adhesives can be used to retain material 72 therein. The cloth material 72 guides the pivoting of upper cube 65 by a puzzle user. Other hinge mechanisms, including strips of durable tape connecting the surfaces of upper cube 65 with "t" base 67 can be employed. Alternatively, the hinge mechanism could be dispensed with and upper cube 65 and "t" base 67 may be formed as separate component pieces.

Figure 11:
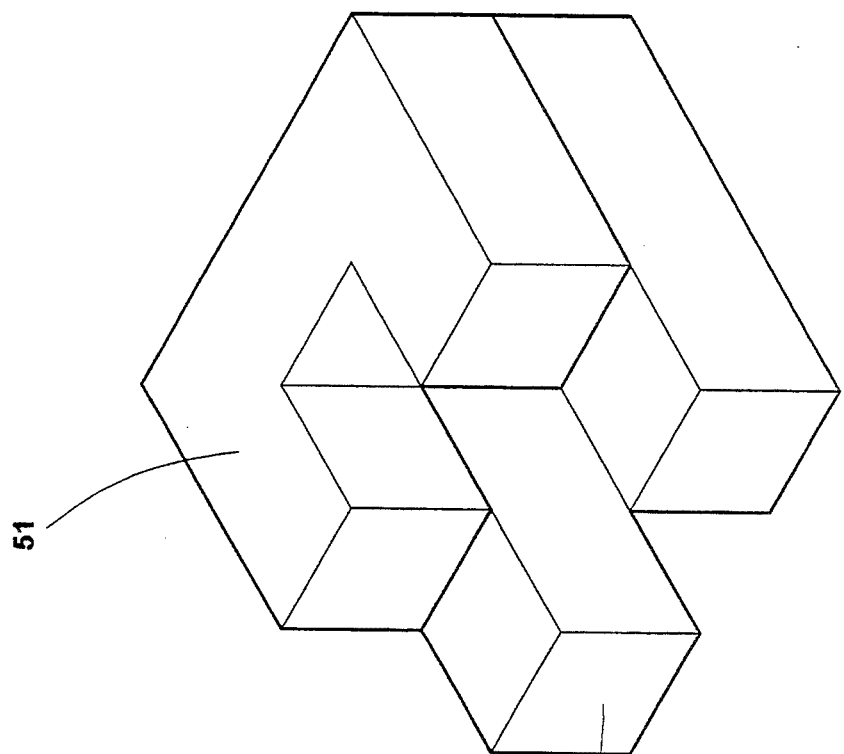
FIGS. 11-14 show step-by-step instructions for assembling the component pieces of the invention embodiment illustrated in FIG. 9 into a three-dimensional cube structure.
Figure 12:
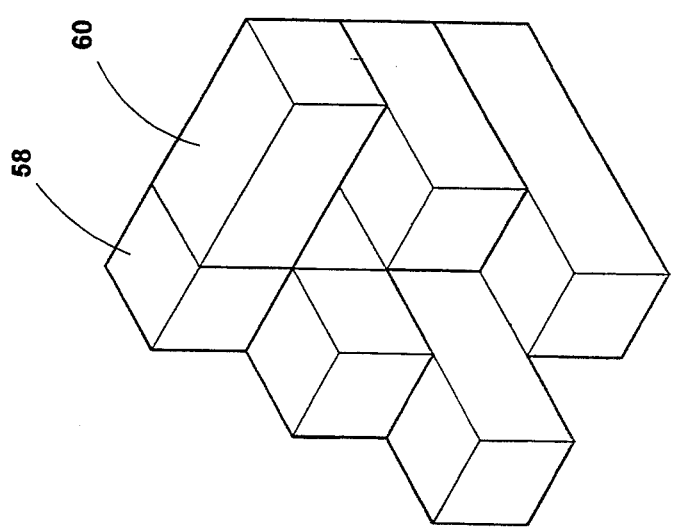

Referring now to FIGS. 11–14, a possible step-by-step solution to the interlocking assembly of the "Unity" puzzle into a three-dimensional cube structure is shown. After "n" component piece 51 is stacked on "U" component piece 50 as shown in FIG. 11, a puzzle user must compress "i" component piece 52 and stack it on the upper leg of "n" component piece 51 as shown in FIG. 12. The "t" base 67 of "t" component piece 53 is then inserted downward into the open core, and upper cube 65 may be pivoted along its hinged edge to the position shown in FIG. 13. Next, "Y" component piece 54 is laterally slid into position to complete the three dimensional cube structure.

Figure 15:
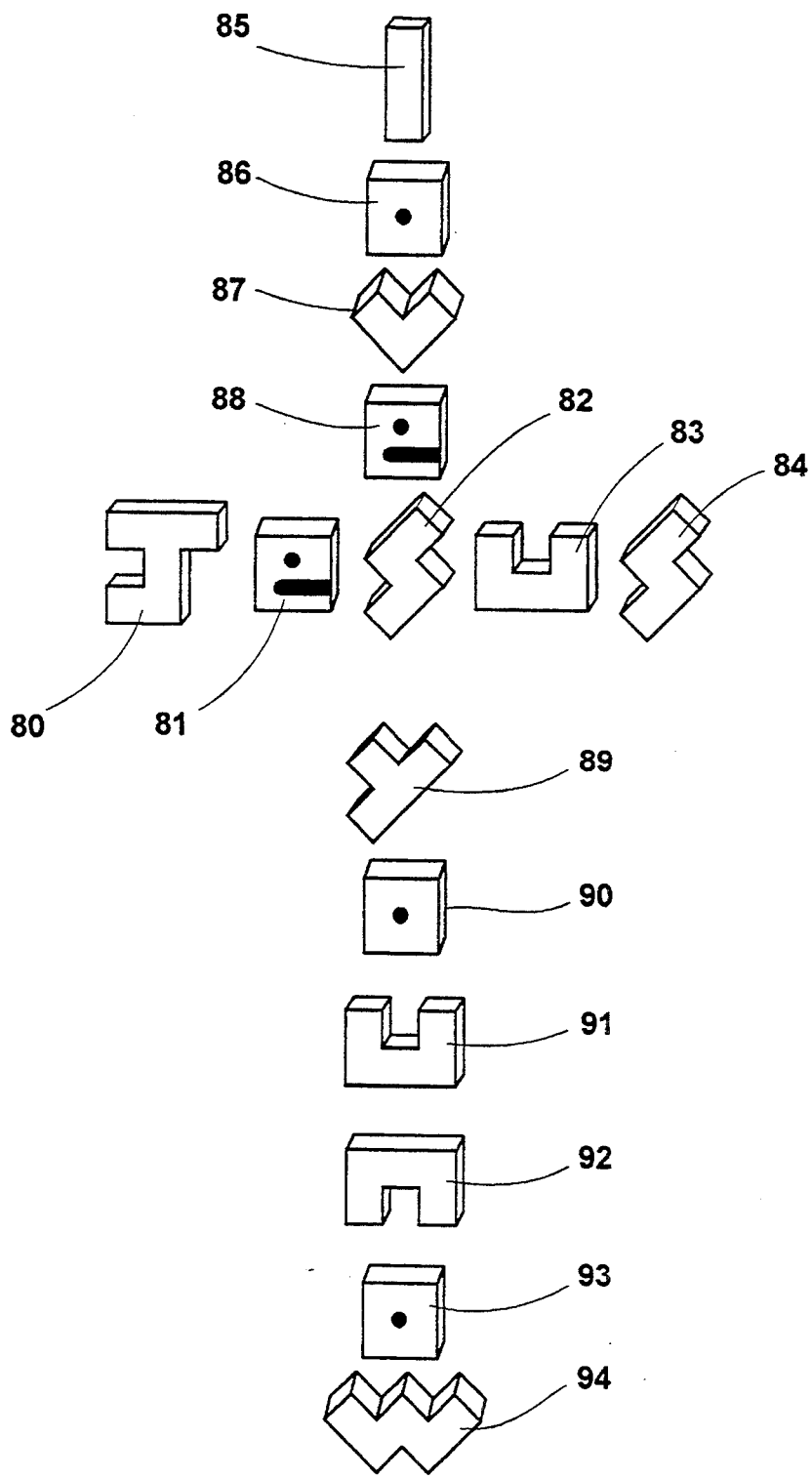
FIG. 15 shows a perspective view of another embodiment of the present invention where the component pieces are in a proper arrangement and orientation to communicate a message.
Figure 18:
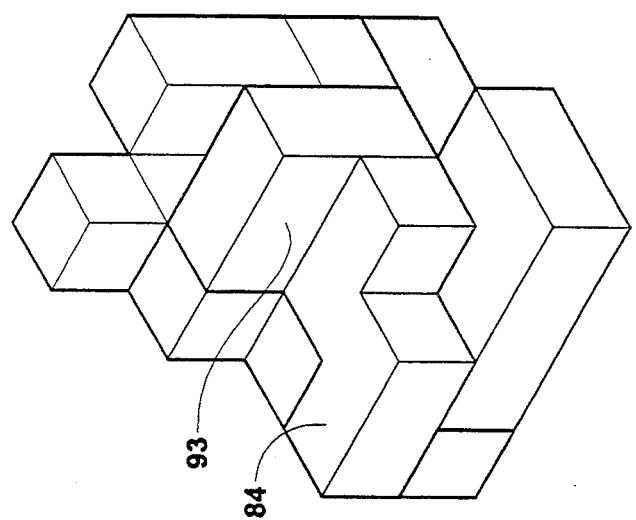
FIGS. 16-21 show step-by-step instructions for assembling the component pieces of the invention embodiment illustrated in FIG. 15 into a three-dimensional cube structure.
Figure 17:
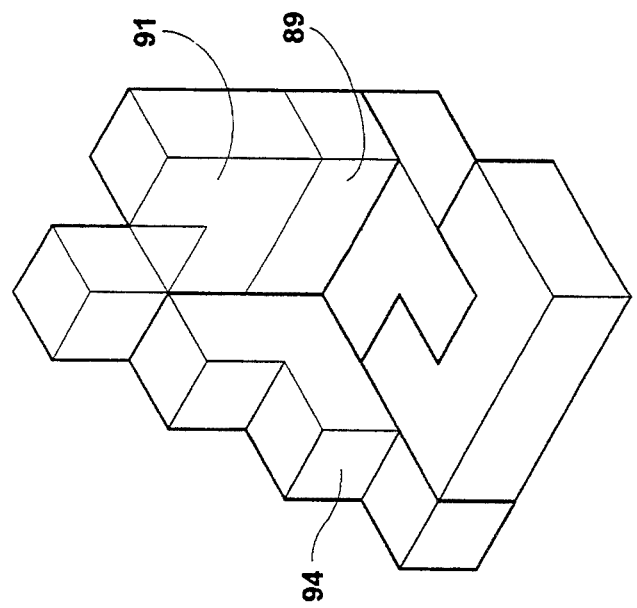

FIG. 15 shows a perspective view of still another embodiment of the present invention. Fifteen component pieces 80–94 can be arranged and oriented as shown to communicate the message "Jesus loves you now", as well as be manipulated and assembled as described below to form a cube structure. In this embodiment, the component piece 82 serves as both an "s" in "Jesus" and the "s" in "loves". In this embodiment, each of the component pieces 80–94 has a two-dimensional shape corresponding to a two-dimensional outline of an alphabet letter.

Figure 16:
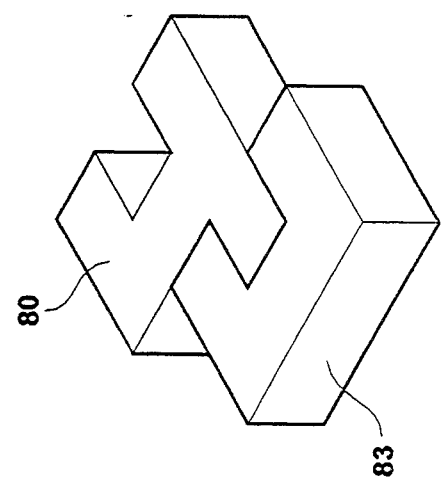
Figure 21:
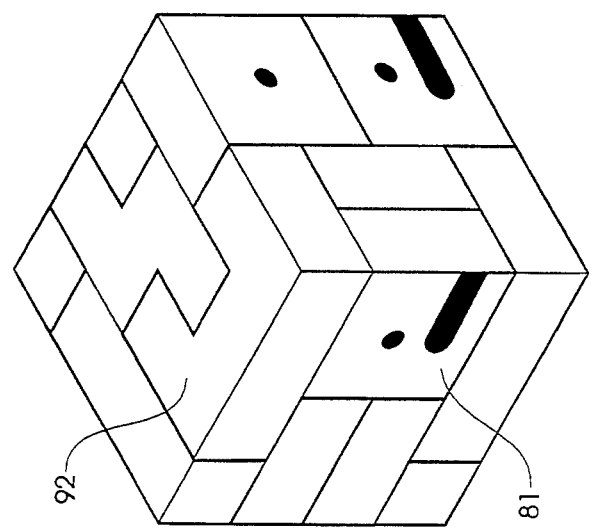
Figure 20:
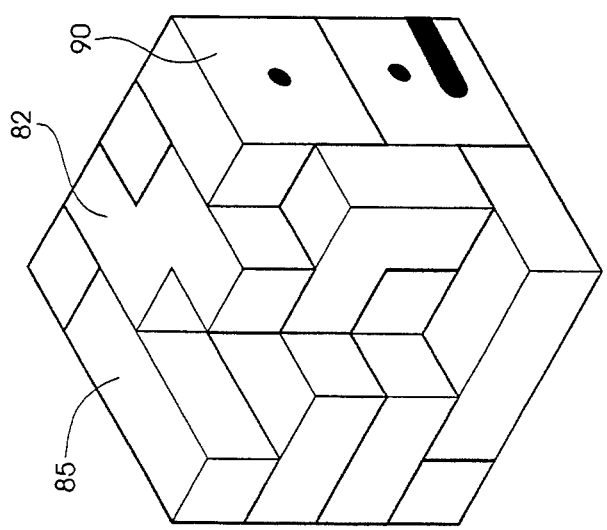
Figure 19:
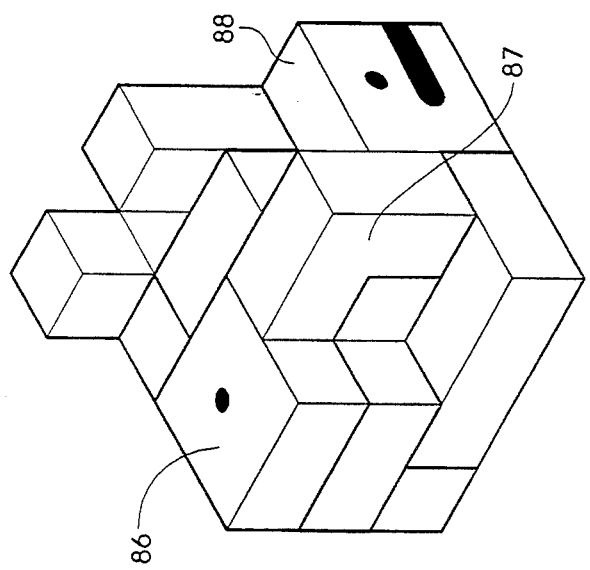

Referring now to FIGS. 16–21, a possible step-by-step solution to the assembly of the puzzle embodiment of FIG. 15 into a three-dimensional cube structure is illustrated. With the "J" component piece 80 and the "u" component piece 83 oriented as shown in FIG. 16 as a starting point, additional component pieces can be assembled into the puzzle as shown in FIGS. 17–21. The order in which these component pieces are shown added is merely illustrative and not intended to be limiting.

In addition to a user forming structures shaped as hexahedrons such as cubes as illustrated, other puzzle solutions may be possible. For example, a puzzle manufacturer could determine a variety of three-dimensional structures, not necessarily defining common geometric volumes, which are possibly formed with a given set of component pieces. Puzzle solutions or goals for a given set of component pieces could also take the form of substantially two-dimensional interlocking solutions. In particular, the puzzle solution could be a preselected geometric shape having a thickness equal to the common depth of the component pieces. Such a puzzle could be solved by placing the component pieces on a flat surface and manipulating these pieces in a manner such as used in well known jigsaw puzzles. In addition, other puzzles with different component pieces which can be assembled into three-dimensional structures or two-dimensional puzzle solutions are within the scope of the present invention. For example, it is believed that component pieces having proper block-like characteristics and which convey the messages "Patience Waits", "Configurations", "Crazy-Blocks", "Create one cube!", or "The Cherry Cube" can be assembled by a user into three-dimensional structures such as cubes. It will be appreciated that these sensible messages are designed to make a puzzle user think about the formation of words or sentences. Moreover, these messages can be instructive or suggestive of the puzzle task and solution, for example "Create one cube!", or descriptive of the puzzle solution, for example, "The Cherry Cube" if the component pieces are formed from cherry wood or red plastic.

While this invention has been described as having a number of preferred designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A puzzle comprising a plurality of individual component pieces, wherein each component piece comprises a two dimensional shape and a third dimension of depth, wherein said two dimensional shapes of at least two of said component pieces are different, wherein said two dimensional shape of each said component piece comprises at least a portion of a two dimensional outline of an alphanumeric character, wherein said plurality of component pieces can be arranged and oriented by a user such that said alphanumeric characters outlined thereby communicate a comprehensible message, wherein said plurality of component pieces can be assembled into a three dimensional structure specified as a puzzle solution, and wherein said three dimensional structure comprises a hexahedron.

2. The puzzle of claim 1 wherein said depth of each component piece is uniform.

3. The puzzle of claim 2 wherein said uniform depth of each said component piece is equal to said uniform depth of all the other said component pieces, and wherein the depth of said three dimensional structure is greater than said uniform depth of said component pieces.

4. The puzzle of claim 1 wherein said alphanumeric characters comprise alphabet letters.

5. The puzzle of claim 1 wherein said two dimensional outline of said alphanumeric characters comprise squared off corners.

6. The puzzle of claim 1 wherein said alphanumeric characters comprise a punctuation mark.

7. The puzzle of claim 1 wherein said hexahedron comprises a cube.

8. The puzzle of claim 1 further comprising a template having recesses for receiving said component pieces, said template recesses structured and arranged whereby said component pieces when positioned in said recesses communicate said message.

9. The puzzle of claim 1 wherein at least one component piece comprises a first element, a second element, and hinge means for interconnecting said first element and said second element such that said at least one component piece can be oriented in a message communicating position and a different structure forming position.

10. The puzzle of claim 9 wherein said hinge means comprises a piece of flexible material received within a first notch in said first element and a second notch in said second element.

11. The puzzle of claim 1 wherein at least one component piece comprises a first element, a second element having a bore therein, and an interconnecting member attached to said first element and received within said bore, whereby said at least one component piece can be oriented in a message communicating orientation and a different structure forming orientation.

12. A puzzle comprising a plurality of component pieces, each component piece comprising one or more interconnected cubes arranged such that each said component piece comprises a two dimensional shape and a uniform depth, wherein said two dimensional shape of each said component piece comprises at least a portion of a two dimensional outline of an alphanumeric character, wherein said component pieces can be arranged and oriented by a user such that said alphanumeric characters outlined thereby communicate a comprehensible message, wherein said component pieces can be assembled in an interlocking fashion into three dimensional structure specified to a user as a puzzle solution, and wherein all of said plurality of component pieces are utilized in assembling said three dimensional structure.

13. The puzzle of claim 12 wherein said comprehensible message is instructive of a puzzle solution.

14. The puzzle of claim 12 wherein said comprehensible message is descriptive of a puzzle solution.

15. A puzzle comprising a plurality of individual component pieces, wherein each component piece comprises a two dimensional shape and a third dimension of depth, wherein said two dimensional shapes of at least two of said component pieces are different, wherein said two dimensional shape of each said component piece comprises at least a portion of a two dimensional outline of an alphanumeric character, wherein said component pieces can be arranged and oriented by a user such that said alphanumeric characters outlined thereby communicate a comprehensible message, wherein said component pieces can be assembled into a three dimensional structure, and wherein at least one component piece comprises a first element, a second element, and hinge means for interconnecting said first element and said second element such that said at least one component piece can be oriented in a message communicating position and a different structure forming position.

16. The puzzle of claim 15 wherein said hinge means comprises a piece of flexible material received within a first notch in said first element and a second notch in said second element.

17. A puzzle comprising a plurality of individual component pieces, wherein each component piece comprises a two dimensional shape and a third dimension of depth, wherein said two dimensional shapes of at least two of said component pieces are different, wherein said two dimensional shape of each said component piece comprises at least a portion of a two dimensional outline of an alphanumeric character, wherein said component pieces can be arranged and oriented by a user such that said alphanumeric characters outlined thereby communicate a comprehensible message, wherein said component pieces can be assembled into a three dimensional structure, and wherein at least one component piece comprises a first element, a second element having a bore therein, and an interconnecting member attached to said first element and received within said bore, whereby said at least one component piece can be oriented in a message communicating orientation and a different structure forming orientation.

* * * * *